(12) United States Patent
Ramli et al.

(10) Patent No.: US 7,857,988 B2
(45) Date of Patent: Dec. 28, 2010

(54) SOUND DEADENER MELT PAD COMPOSITION

(75) Inventors: Ridzuan bin Ramli, Selangor (MY);
Mohd Basri bin Wahid, Selangor (MY);
Nasrin bin Abu Bakar, Selangor (MY);
Robaya bt Mohamed Halim, Selangor (MY); Ravindranathan a/l N. Narayana Menon, Selangor (MY);
Astimar bt Abd Aziz, Selangor (MY)

(73) Assignee: Malaysian Palm Oil Board (MPOB), Kanjang, Selangor (MY)

( * ) Notice: Subject to any disclaimer, the term of this patent is extended or adjusted under 35 U.S.C. 154(b) by 126 days.

(21) Appl. No.: 12/275,261

(22) Filed: Nov. 21, 2008

(65) Prior Publication Data

US 2009/0127490 A1 May 21, 2009

(30) Foreign Application Priority Data

Nov. 21, 2007 (MY) .............................. PI 20072056

(51) Int. Cl.
*E04B 1/74* (2006.01)
(52) U.S. Cl. .................. 252/62; 106/278; 106/282; 106/284.04; 428/332; 428/364; 428/365; 428/368; 428/401; 524/59
(58) Field of Classification Search .............. 252/62; 106/278, 282, 284.04; 524/59; 428/332, 428/364, 365, 368, 401
See application file for complete search history.

(56) References Cited

U.S. PATENT DOCUMENTS

| 2,362,839 | A | * | 11/1944 | Marc ........................... 106/280 |
| 2,756,159 | A | * | 7/1956 | Kendall et al. .............. 428/332 |
| 2,858,231 | A | * | 10/1958 | Watson ....................... 106/285 |
| 4,133,932 | A | * | 1/1979 | Peck ........................... 428/323 |
| 4,287,263 | A | * | 9/1981 | Woodring et al. ........... 428/489 |
| 4,325,858 | A | * | 4/1982 | Saito et al. .................. 524/524 |
| 4,367,259 | A | * | 1/1983 | Fulmer et al. ............... 442/120 |
| 4,438,288 | A | * | 3/1984 | Imai et al. ................... 585/379 |
| 4,456,705 | A | * | 6/1984 | McCarthy .................... 521/83 |
| 4,495,240 | A | * | 1/1985 | McCarthy ................. 428/319.1 |
| 4,838,939 | A | * | 6/1989 | Kanda et al. ............. 106/281.1 |
| 5,093,394 | A | * | 3/1992 | Rees et al. .................... 524/68 |

FOREIGN PATENT DOCUMENTS

| DE | 19750769 A1 | * | 5/1999 |
| JP | 52-47701 A | * | 4/1977 |
| JP | 60-215013 A | * | 10/1985 |
| JP | 62-277966 A | * | 10/1987 |
| SU | 698942 A | * | 11/1979 |

OTHER PUBLICATIONS

Derwent-Acc-No. 1989-301250, abstract of German Patent Specification No. DD267987A (May 1989).*
Derwent-Acc-No. 2004-325932, abstract of Korean Patent Specification No. KR2003-083092A (Oct. 2003).*

* cited by examiner

*Primary Examiner*—Anthony J Green
(74) *Attorney, Agent, or Firm*—Maier & Maier, PLLC

(57) ABSTRACT

The present invention relates to a sound deadener melt pad composition, wherein the composition includes an asphalt, EVA H2020, a oil palm fiber, a hydraulic lime and an oil palm olein.

11 Claims, 2 Drawing Sheets

SOUND DEADENER MELT PAD COMPOSITION

CROSS REFERENCE TO RELATED APPLICATIONS

This application claims priority, under 35 U.S.C. §119(b), to Malaysian patent application No.: PI 20072056, filed Nov. 21, 2007, the disclosure of which is incorporated by reference herein in its entirety.

FIELD OF INVENTION

This invention relates to a sound deadener melt pad composition.

BACKGROUND OF INVENTION

The use of melt pads in the automotive industry had been going on for quite some time now. These sound deadener melt pads are being used as a sound deadener to prevent excessive vibrations and noise in the car which can be an irritant as well as reduce comfort to the drivers and passengers inside the car.

Prior arts of the sound deadener melt pads like U.S. Pat. No. 4,838,939 and Japanese patent No.: JP 52-50522 where they use organic fibrous fillers such as animal fibres like wools, hairs, feathers, etc. and plant fibres like cotton, hemp, decomposed used fibres obtained corrugated cardboards, newspapers, magazine or the likes. However, none of them use oil palm fibres which are not common in countries like Japan, China, United States, etc.

Also in prior arts documents U.S. Pat. No. 4,325,858 and Japanese patent No.: JP 60-215013 where binders like calcium carbonate, quicklime etc., are being used. However, no known patents had ever used hydraulic lime as a binder which has a more stronger adhesive properties as well as a good disinfectant to prevent microbes from attacking or devouring the organic fibres and causing the early deterioration of the sound deadener melt pads.

Present acoustic engineering industries are using glass wool, paper cardboards, textile curtains and chip boards, etc., for sound dampeners inside the sound recording rooms, cinemas and concert halls.

Malaysia, being a major oil palm producer in the world, has a lot of surplus oil palm biomass waste by-products like Empty Fruit Bunch (EFB) which can be usefully utilized in the sound deadener melt pad production.

SUMMARY OF INVENTION

Accordingly, there is provided a sound deadener melt pad composition, wherein the composition includes an asphalt between 10% to 30% by weight, preferably at 20% by weight, an acetate between 3% to 10% by weight, preferably at 3% by weight, a fibre of between 3% to 30% by weight, preferably at 6%, by weight, a lime of between 40% to 75% by weight, preferably at 70% by weight, and an olein of between 0.2% to 1.5% by weight, preferably at 1% by weight.

The present invention consists of several novel features and a combination of parts hereinafter fully described and illustrated in the accompanying drawings, it being understood that various changes in the details may be made without departing from the scope of the invention or sacrificing any of the advantages of the present invention.

BRIEF DESCRIPTION OF THE ACCOMPANYING DRAWINGS

For the purpose of facilitating and understanding of the present invention, there is illustrated in the accompanying drawings, from an inspection of which, when considered in connection with the following description, the invention, its construction and operation and many of its advantages would be readily understood and appreciated.

DETAILED DESCRIPTION OF THE PREFERRED EMBODIMENT

Figure 1:
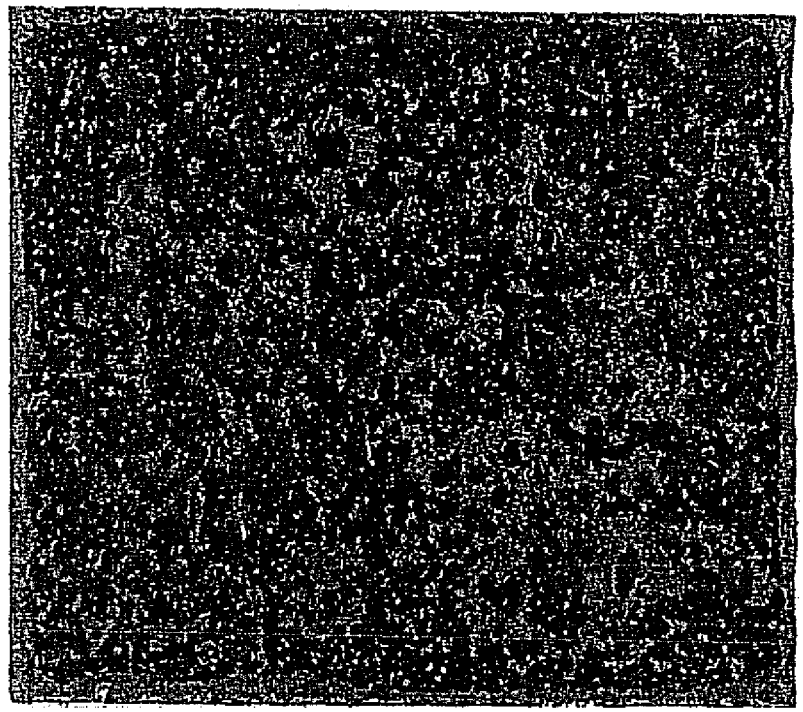
FIG. 1 is a picture of the actual oil palm fiber sound deadener melt pads as produced in the laboratory.
Figure 2:
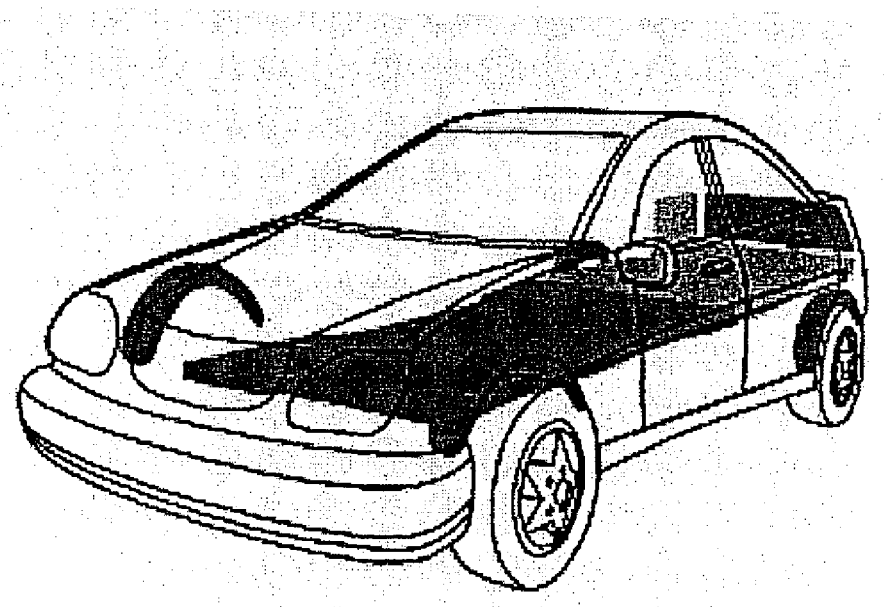
FIG. 2 illustrates a preferred example of the oil palm fiber sound deadener melt pads as for automotive use.
Figure 3:
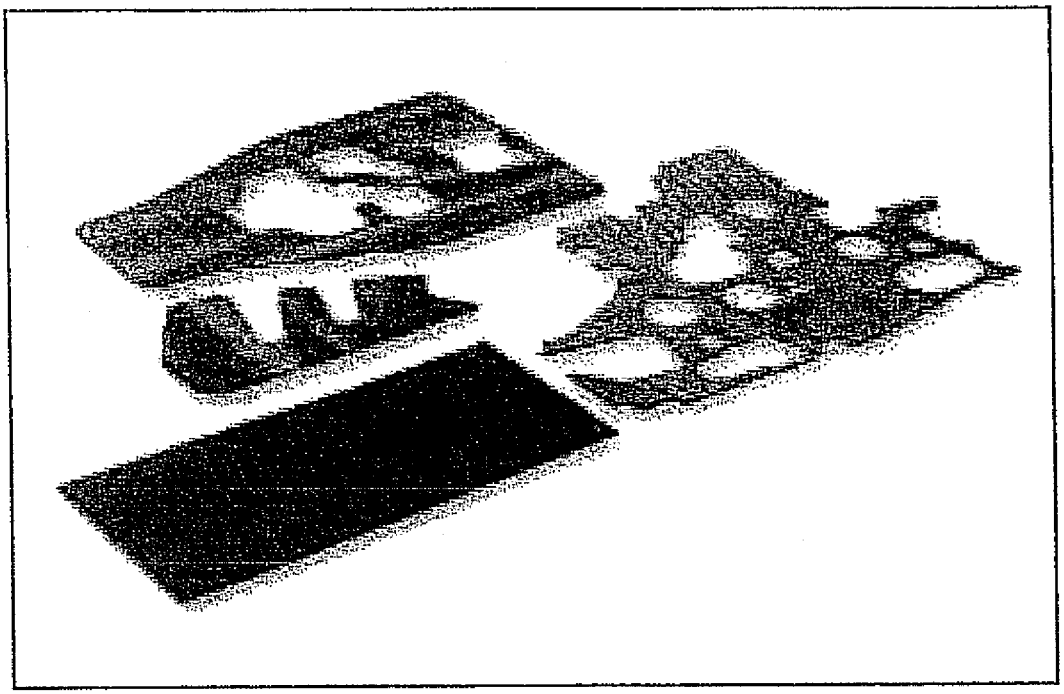
FIG. 3 illustrates various shapes of the sound deadener melt pads for use in the automotive industry.
Figure 4:
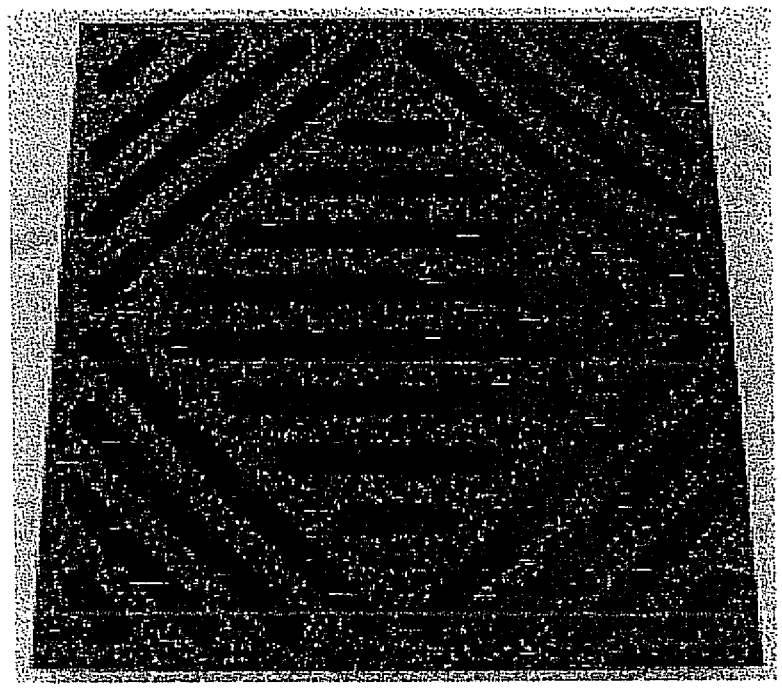
FIG. 4 illustrates a preferred example of the oil palm fiber sound deadener melt pads being used in the acoustic industry.

The present invention relates to a sound deadener melt pad composition. Hereinafter, this specification will describe the present invention according to the preferred embodiments of the present invention. However, it is to be understood that limiting the description to the preferred embodiments of the invention is merely to facilitate discussion of the present invention and it is envisioned that those skilled in the art may devise various modifications and equivalents without departing from the scope of the appended claims.

The present invention aims to utilize the abundant surplus biomass waste products of the oil palm industry and to use the oil palm fibres as an ingredient fillers in the manufacture of a sound deadener melt pad for the automotive and the acoustic industries. The major components of the sound deadener melt pad shall are asphalt, ethylene vinyl acetate, oil palm fibre, lime and olein.

According to the preferred embodiments of the present invention, the contents of the components by weight are as follows:

(a) asphalt—between 10% to 30% by weight, preferably at 20% by weight;
(b) ethylene vinyl acetate—between 3% to 10% by weight, preferably at 3% by weight;
(c) oil palm fibre—between 3% to 30% by weight, preferably at 6% by weight;
(d) lime—between 40% to 75% by weight, preferably at 70% by weight; and
(e) olein—between 0.2% to 1.5% by weight, preferably at 1% by weight.

The inorganic hydraulic lime which has a good binding properties can also function as a disinfectant to kill and discourage microbes from attacking and devouring the organic oil palm fibres and thus causing the deterioration of the sound deadener melt pad product.

The function of the oil palm olein is to act as a dispersion and as a lubricant for the rollers so as to produce a consistent layer and a good mix of the sound deadener melt pad material. This will also help to prevent dry 'caking' and thus causing the sound deadener melt pad to be dry, fragile and easily broken. Otherwise the sound deadener melt pad material can easily be broken up and snapped into pieces.

The oil palm olein will help to make the sound deadener melt pad material to be pliant and more flexible instead of being brittle and can break/snap off easily.

According to the preferred embodiment of the present invention, there is provided a composition particularly adapted to the sound deadener melt pad that contains from 5 to 23 parts by weight preferably around 20 parts by weight of asphalt, a binder EVA H2020 of composition from 2.5 parts by weight to 5.5 parts by weight but preferably 4.11 parts by weight. The oil palm fiber composition used in the manufacture of the dampening sheet varies from 3 parts by weight to 7 parts by weight but should ideally be 5.48 parts by weight. The hydraulic lime used in this composition is from 65 parts by weight to 78 parts by weight but is recommended to 71.23 parts by weight. The oil palm olein used in this sound deadener melt pad composition varies from 0.4 parts by weight to 1.2 parts by weight but is ideally be 0.8 parts by weight.

The composition of the invention may be prepared by any method known in the art. One of the preferred methods comprises steps of melting a binder component, such as asphalt 19.18%, with heat and mixing it with a filler component comprising of palm oil fibres 5.48%, hydraulic lime 71.23% and an additional binder of EVA H2020 4.11% is also blended in into the compound. The oil palm olein 0.8% is also added in sparingly while the mixture is being stirred under heat.

The composition of the invention is particularly adapted to the sound deadener melt pad. Thus, the composition of the invention then may be extruded and rolled to give a sheet. If desired, the sheet may be given uneven surface using, for instance, emboss roll.

Where the compositions of the invention is formed into a sound deadener melt pad, it may contain one or more conventional additives such as plasticizer, stabilizer, flame retardant, foaming agent, foaming aid, vulcanizer, or the like. The sound deadener melt pad thus prepared is then cut into desired shape of the site, to which the sheet is adhered. Where appropriate, the sheet is trimmed with a mold of the desired shape, fitted with a trimmer, for adjusting the uneven shape of the site.

Where the sound deadener melt pad is shaped with mold, it is placed on the lower part of the mold, after which it is shaped by pressing it with the upper and lower parts of the mold. Trimming and shaping of the sound deadener melt pad may be carried out simultaneously, for example, by using a mold fitted with a trimmer on either side, and this is a preferred method in view of the decreased steps involved and the increased operability.

Where the sound deadener melt pad is fixed upon the steel panel of the vehicle, it is first place on the panel in the case of the floor part of the vehicle, and then it is heat melted to complete adhesion. In the case of the dash part, the sound deadener melt pad is fixed tentatively upon the steel panel and then it is heat melted to complete adhesion. The tentative fixation may be performed using an adhesive or by the use of magnetic power.

The heat melting, or baking, may be in complete at a temperature of from about 80° to 180° C. for a period of from about 10 to 60 minutes, whereby the sound deadener melt pad and the steel panel may be unified.

Where the sound deadener melt pad is used as the soundproof material, together with a bulky non-woven fabric, such material may be baked likewise or, alternatively, it may be fixed using clips. The other side of the sheet, namely the side which is not adhered to the steel panel, may be coated with a suitable paint, whereby it is imparted the function of being a restraint layer of the sandwiched damping material. For the use of the sound deadener melt pad in the acoustic industry by the sound engineer. It can be installed as a single layer, two or even multi-layered throughout the acoustic room or halls.

It has been identified that the hydraulic lime not only acts a filler but also as a binder and a disinfectant to prevent the deterioration of the oil palm fibres from attack by microbes and fungi.

Also found that the use of hydraulic lime or all other similar limes or related substance which has a good adhesive properties can act also as a binder as well as a filler serving two functions.

Furthermore, it was found that the use of oil palm olein as a dispersant as well as a lubricant for the rollers could also be substituted by any other organic or inorganic as well as any synthetic oils.

Table 1 below shows the test results on the oil palm fiber sound deadener melt pads showing full compliance with the International Automotive Standards requirements.

| Oil Palm Loading (%) | Test Method (ES-X 62223/6) | Results | Note |
|---|---|---|---|
| 5.48% | Shrinkage (<2%) | 1.25 | Comply |
| | Ash Content (<60%) | 42 | Comply |
| | Loss on Heating (<0.6%) | 0.3 | Comply |
| | Heat Fluidity (<10 mm) | 5 | Comply |
| | Impact Resistance (at 5° C. and 20° C. > 35 Cm high) | No crack | Comply |
| | Heat Deflection (<10 mm) | 5.84 | Comply |
| | Heat Adhesion (>50%) | 68 | Comply |
| | Odor (No excessive Stink) | Level 4 | Comply |
| | Surface Tack and Deformation | No Crack | Comply |
| | Smoke Temperature (>160° C.) | 161 | Comply |
| | Damping Resistance ((>0.05) | 0.095 | Comply |

The invention claimed is:

1. A sound deadener melt pad composition, wherein the composition comprising:
    (a) an asphalt between 10% to 30% by weight,
    (b) an acetate between 3% to 10% by weight,
    (c) a fibre of between 3% to 30% by weight,
    (d) a lime of between 40% to 75% by weight, and
    (e) an olein of between 0.2% to 1.5% by weight.

2. The sound deadener melt pad composition as claimed in claim 1, wherein the acetate is ethylene vinyl acetate.

3. The sound deadener melt pad composition as claimed in claim 1, wherein the fibre has a length less than 500 µm.

4. The sound deadener melt pad composition as claimed in claim 3, wherein the fibre is oil palm fibre.

5. The sound deadener melt pad composition as claimed in claim 1, wherein the lime is hydraulic lime.

6. The sound deadener melt pad composition as claimed in claim 1, wherein the olein is oil palm olein.

7. The sound deadener melt pad composition according to claim 1, wherein the asphalt is present in the amount of about 20% by weight of the composition.

8. The sound deadener melt pad composition according to claim 1, wherein the acetate is present in the amount of about 3% by weight of the composition.

9. The sound deadener melt pad composition according to claim 1, wherein the fibre is present in the amount of about 6% by weight of the composition.

10. The sound deadener melt pad composition according to claim 1, wherein the lime is present in the amount of about 70% by weight of the composition.

11. The sound deadener melt pad composition according to claim 1, wherein the olein is present in the amount of about 1% by weight of the composition.

* * * * *